June 22, 1971

MASAMI MIYA  3,585,649
TOILET UNIT UTILIZING SELF-MAINTAINED FOAM

Filed July 29, 1968  7 Sheets-Sheet 1

*Masami Miya*
INVENTOR.
MASAMI MIYA
BY *Otto John Munz*
ATTORNEY

INVENTOR.
MASAMI MIYA

_United States Patent Office_

3,585,649
Patented June 22, 1971

3,585,649
TOILET UNIT UTILIZING SELF-MAINTAINED FOAM
Masami Miya, Tokyo, Japan, assignor to Nepon Kabushiki Kaisha Nepon Co., Ltd., Tokyo, Japan
Filed July 29, 1968, Ser. No. 748,398
Claims priority, application Japan, Nov. 30, 1967, 42/76,563; Apr. 8, 1968, 43/27,718, 43/27,719, 43/27,720, 43/27,721, 43/27,722
Int. Cl. A47k 11/00
U.S. Cl. 4—9         6 Claims

ABSTRACT OF THE DISCLOSURE

A defecating system in which foam is provided always in a stool and excrement is sealed by the foam visually, odorproofly, and hygienically in the stool just after the excrement is put therein and transferred out of the stool while being wrapped, sealed, and lubricated by the foam, without necessity of the action of an appreciable quantity of water. Specified convenience and equipments for the specified system are also disclosed.

BACKGROUND OF THE INVENTION

Field of the invention

This invention would belong to the field of the sanitary engineering. However, in a broad sense it would relate to the architectural engineering, civil engineering, city planning, sewage disposal, etc., because a tremendous quantity of water would be saved by virtue of the defecating system in accordance with this invention. In the U.S. patent classification, this invention would be classified into Class 4.

Description of the prior art

Heretofore, it is well known that there have been such primitive systems as the night-soil dipping up system, the bed-pan system, and the excrement burning system for settling the urination and defecation. Of course, these systems are disadvantageous and unfavourable.

The water closet system is farther progressive than such primitive systems and includes many subsystems. In general in accordance with the water closet system, the excrement is stopped in a quantity of dead-water contained in a basin of a stool for a while. Subsequently, the excrement thus accumulated in the basin is transferred into a sewage, a purifying tank, or another storage through a trap by the action of a large quantity of water jetted into the basin, while the basin and the trap are washed.

The basin for the night-soil dipping up system requires an appreciable broad vertical outlet so that the following drawbacks are inherent thereto and unavoidable in spite of any improvement.

(a) It is impossible to construct and carry out the system in an odorproof manner.

(b) Maggots would be hatched.

(c) The user would be splashed with contaminated water.

(d) The excrement and other contaminated matter may be directly visible.

(e) It is difficult to avoid the bacterially dangerous condition.

Although the water closet is evaluated far higher than the primitive systems, there are such drawbacks inherent thereto, as follows:

(a) Tremendous quantity of water is required. One defecating operation requires a matter of from 11 to 15 liters of water. A ten million population of a city must be provided with a water supply corresponding to the yearly consumption thereof up to about 180,000,000 kiloliters for the sanitary use only.

(b) Accordingly bulky sewage disposal proportions to the scale of the water supply must be provided.

(c) The splashing problem has not been solved.

(d) The operation of the system is limited by frozen water when the weather is bitterly cold.

(e) The odorproof effect is not sufficient.

(f) It is inevitable to be restrained by a public utility. If the public utility is disordered, the system is forced to be disordered therewith.

(g) An appreciable noise due to the jetting water is unavoidable.

SUMMARY OF THE INVENTION

This invention relates to a novel defecating system for receiving, hiding, sealing, transferring, and settling body wastes, that is excrement and/or urine. Briefly stated in accordance with one aspect of this invention, there is provided a toilet unit which may be a stool or a funnel-shaped urinal. The toilet unit is provided with foaming means. The foam thus produced automatically and additionally optionally is held inside the unit. When excrement is put in the unit, it is received, sealed, and hidden by the foam inside the unit at once. The excrement is transferred out of the unit together with the foam through an outlet in the bottom of the unit by gravity and the lubricating action of the foam.

The foam by which this invention is characterized is produced by an aqueous surface active agent solution. A chemical which is capable of foaming by a physical change or a chemical change may be substituted for the aqueous surface active agent solution. That is, it is necessary to understand the term "surface active agent" in a wide sense, so that soap and other detergents should be included therein. Even if a chemical itself has not the surface active property, in case where a detergent is made stronger in the foaming and/or lubricating properties by adding the chemical to the detergent as an auxiliary component for the surface activity, the chemical is to be understood as a surface active agent in this invention. Although only water is useful as the medium for dissolving the surface agent hereinbefore, and other mediums may not be useful from the economical point of view, technically speaking, it is also possible to use other mediums than water. It is unnecessary to define a strict range in concentration for the aqueous surface active agent solution, but an adequate range is sufficient for carrying out the system in accordance with this invention. For example, about 0.1 to 2 percent aqueous solution of most detergents available in the market is sufficiently foaming. It is impossible to use those having a value of 1.5 to 3 in hydrophilic-lipophilic balance among the surface active agents, because they have defoaming action. Nonionic surface active agents are inferior in the foaming action and, in addition, generally expensive, so that they are not useful for carrying out the system in accordance with this invention. It is preferred to use a so-called soft detergent or surface active agent which is apt to be decomposed with ease within a short period by microorganisms when the agent is drained into the sewage, in the sense of preventing a public damage. The foaming surface active agent is more or less lubricating, and, in addition, generally bactericidal. However, it is possible to add specially a bactericide as well as a perfume and/or a colorant to the aqueous surface active agent solution. The higher the temperature of the aqueous surface active agent solution within the range of the ambient temperatures, the larger the foaming property of the solution. In case of extremely cold weather, it is easy to settle the matter of frozen solution by means of an immersion heater and a thermostat as in case of the tropical fish cultivation, so that the foaming action may be sufficiently secured. Because of the fact that an extremely small quantity of water is consumed in the system in accordance with this invention unlike in case of the water closet, it is economically possible and effective to provide an electrically heating means.

In accordance with this invention, it is necessary to provide a means for producing foam. The foam may be produced anywhere, but it is preferred that the foam producing means is associated and cooperated with a stool. The foam may be supplied to the inside of the stool externally, but it is preferred that the foam is introduced into a cavity of the stool directly just after the foam has been produced inside the stool. The water sealing is not used in the system in accordance with this invention, so that it is not necessary to shape the inside space of the stool as to be called a basin and to provide a trap. It is possible to shape the inside space of the stool more simply such as in an inverted cone or an inverted frusto-cone, so that the inside space is called a cavity hereinafter. The lowermost end of the cavity is communicated with a foam-sealing tube but not a trap. The excrement put in the cavity is transferred through the foam-sealing tube out of the system by gravity and the lubricating action of the foam together therewith, so that it is necessary that the inclination of the inner wall of the cavity of the stool is at least 40° and the inclination of the foam-sealing tube is at least 25°. An adequate diameter for the foam-sealing tube is 75 mm.

The defecating system in accordance with this invention is meritorious as follows:

(A) Since a quantity of a matter of $\frac{1}{150}$ to $\frac{1}{300}$ or 15 liters of the aqueous surface active agent solution (concentration is 0.1 to 1%) is consumed for an operation of defecation, while the 15 liters of water are consumed correspondingly by a water closet, it is to be deemed that but little water is consumed, resulting in that the municipal watering problem would be substantially decreased, and, in turn, reduction in the sewage scheme would become possible, whereby the national and/or local finance would be appreciably contributed and the head-waters for the excessively populous area would be well protected.

(B) By virtue of the lubricating action of the aqueous surface active agent solution, the inner wall of the cavity of the stool is not contaminated at all by excrement. The inner wall is automatically cleaned for each operation so that the stool is maintained clean and sanitary. The excrement stays within the cavity of the stool for such a little period so that bacteria and parasitic eggs do not spread.

(C) By virtue of the mass of foams filled in the outlet and foam-sealing tube, the excrement is immediately hidden behind them and exhausted promptly so that the toilet is deodorized effectively.

(D) By virtue of the non-elasticity of the foams, the contaminated foams do never splash by the excretory behaviour, even in case of the urination.

(E) By virtue of the insecticidal action of the surface active agent, maggots are never hatched.

(F) By virue of the fact that the aqueous surface active agent solution has a lower melting point than water and is stirred from time to time automatically by foaming operation, the aqueous surface active agent solution is hard to be frozen, so that it is possible to use the defecating system in accordance with this invention in such a frigid area where the water closet is deemed impertinent. Even in an extremely frigid locality, it is possible to use the system at a relatively low cost by warming the aqueous surface active agent solution electrically because the quantity of the aqueous surface active agent solution to be warmed and consumed is small.

(G) By virtue of the fact that addition of the disinfectant, perfume and/or colorant to a surface active agent is not chemically objectionable in many cases, it is possible to make the stool more sanitary and olefactorily and visually cleaner.

(H) When a soft surface agent is used, a domestic activated-sludge digestion tank may be substituted for the storage tank. In such a case, it is technically possible to reduce the volume of the digestion tank comparing with a requirement in case of a water closet by virtue of the reduced flow. Alternatively, in case of the same volume of the digestion tank with that of the water closet, the biological decomposition of the excrement is proceeded further completely, because it is possible to stay the same in the digestion tank for a longer period.

(I) The defecating system in accordance with this invention is simple in structure, does not require provision of a large quantity of water, and may be lightened by using reinforced plastics as the material of the stool, so that it is easily possible to make the same portable or be adapted to be installed as a unit. When used in a unit it is possible to use for a longer period without replacing or emptying the tank than in case of other systems.

(J) By virtue of absence of a trap within the exhausting pipe system, it is simpler to repair and run through again in this system than others provided with a trap, when the outlet and/or the foam-sealing tube are clogged by an unexpected obstacle.

(K) Nobody is annoyed by the noise due to flush which is inherent to the water closet.

(L) By virtue of absence of a movable part in the defecating passage, it is simple and may be operated without contamination to repair the same and replace a part thereof.

(M) Even if the water service is interrupted, it is possible to use the defecating system in accordance with this invention as it is normally for ten times or more of operation by virtue of the storage of the aqueous surface active agent solution inside the system.

BRIEF DESCRIPTION OF THE DRAWING

The invention will be better understood and other objects and additional advantages of the invention will become apparent upon perusal of the following description taken in connection with drawings, in which.

DESCRIPTION OF THE PREFERRED EMBODIMENTS

Figure 1:
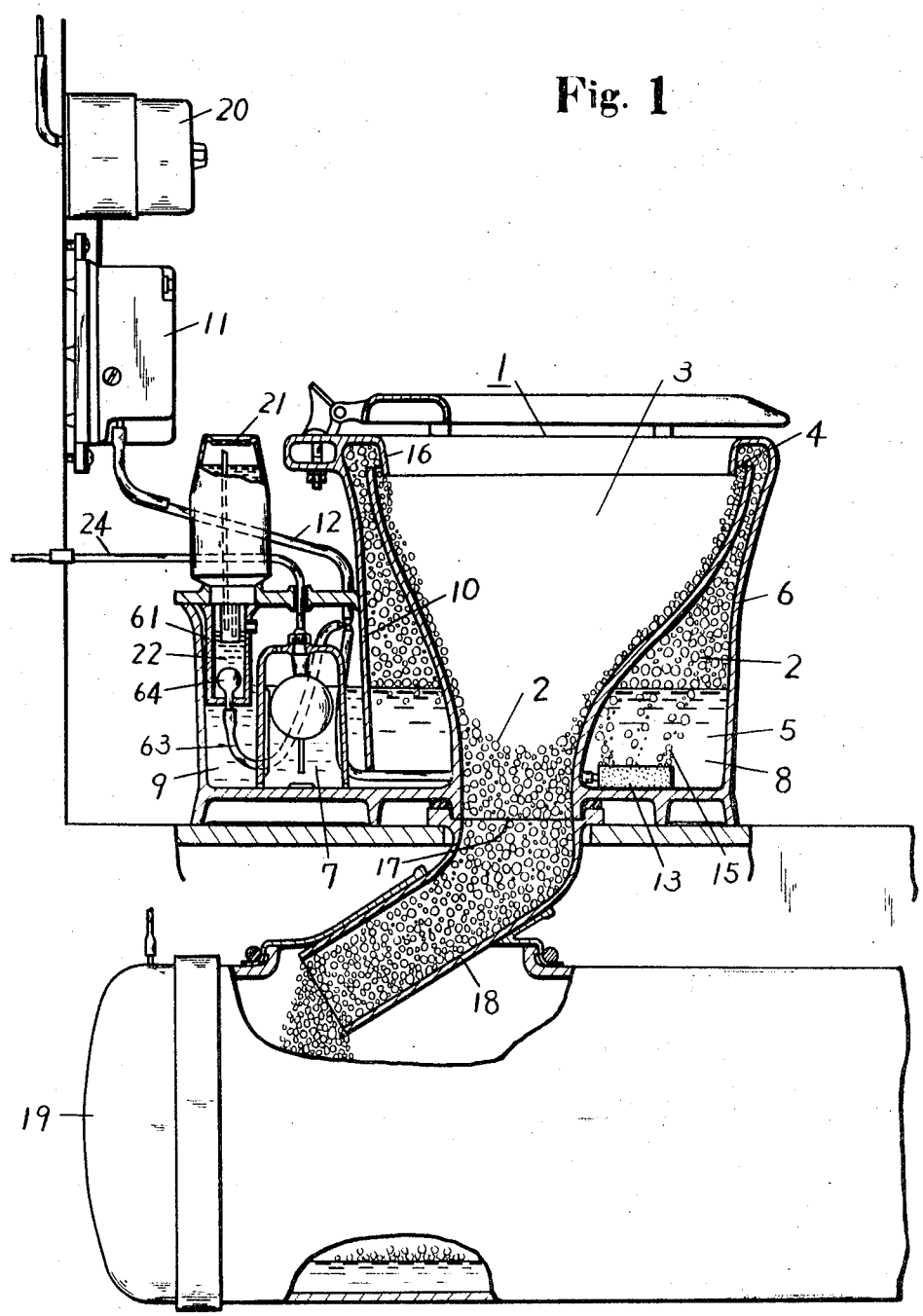
FIG. 1 is a partly sectional side elevational view of a toilet unit embodying this invention.
Figure 2:
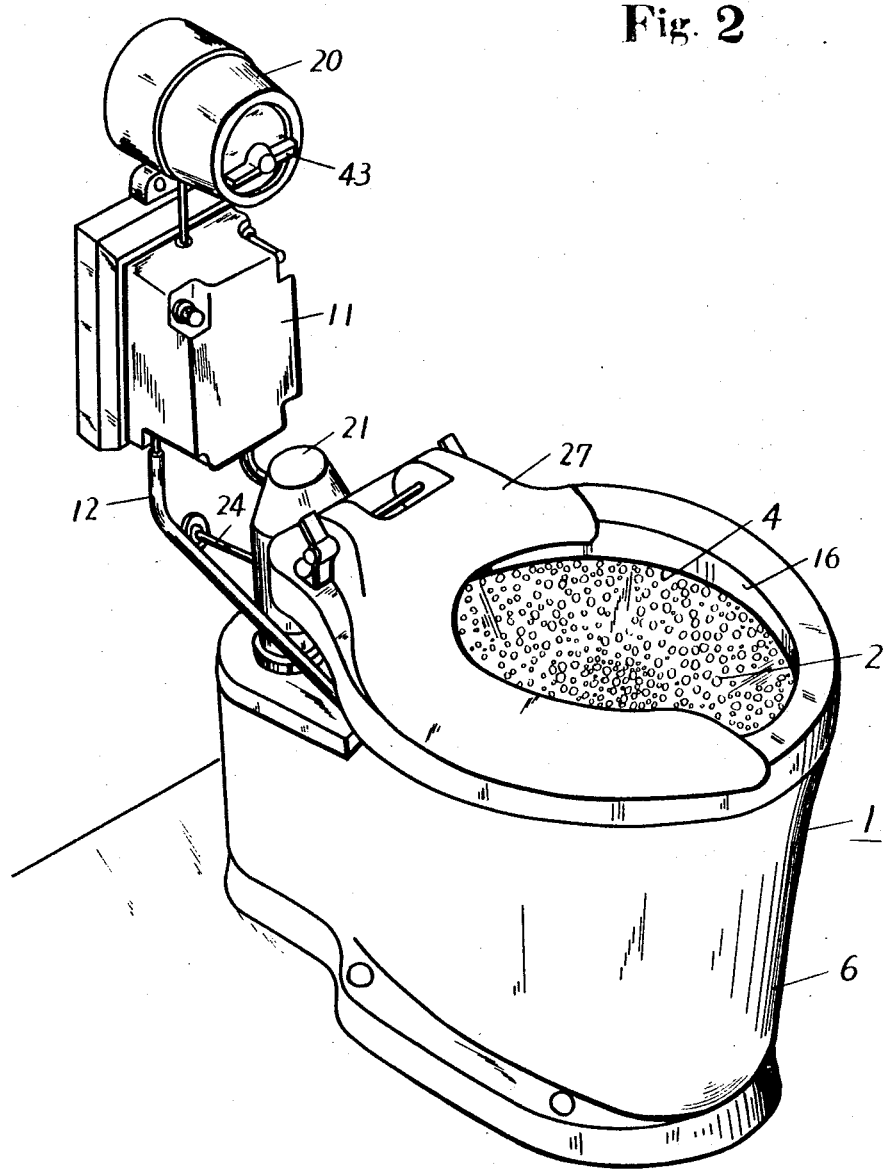
FIG. 2 is a partly removed perspective view thereof.
Figure 3:
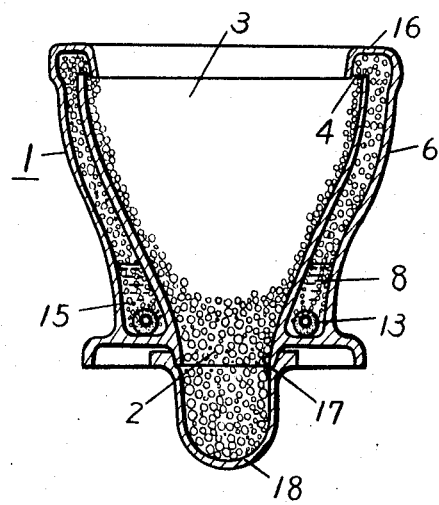
FIG. 3 is a partly removed vertically sectional front elevational view of a stool shown in FIGS. 1 and 2.

Referring more particularly to the drawings, the preferred embodiments of this invention will now be described; however, this description will be understood to be illustrative of the invention and not as limiting it to the particular construction and method shown and described. There is a toilet unit or defecating stool 1 which is also useful as a urinal and most easily adaptable for carrying out the defecating system in accordance with this invention. Reference numeral 2 denotes foam. Although the foam may be supplied into the cavity 3 of the stool 1 externally, it is preferred to supply fresh just foamed foam into the cavity 3 and, in addition, uniformly through the inner peripheral gap 4 along the top edge of the wall of the cavity 3.

Figure 5:
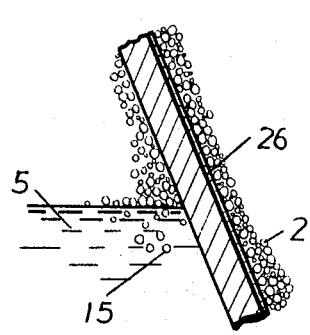
FIG. 5 is an enlarged view of a portion of the stool shown in FIGS. 3 and 4.
Figure 4:
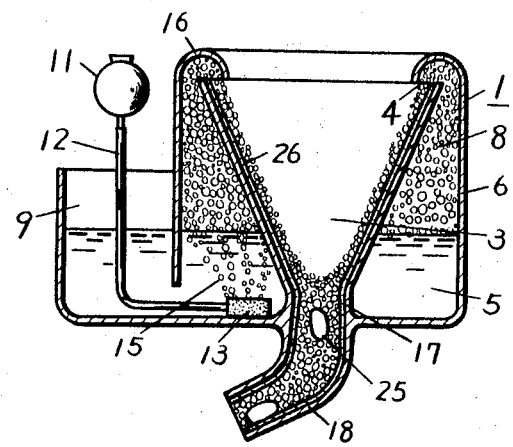
FIG. 4 is a view more explanatory than and similar to FIG. 3.

In accordance with this invention, the substantially funnel-shaped stool 1 is constructed as shown in the drawing for facilitating to keep consumption of the aqueous surface active agent solution 5 in a low level and from the hygienic point of view. The stool 1 has the inner wall of the cavity 3 and an outer wall 6. The aqueous surface active agent solution 5 is stored in a storage formed between the two walls. The storage is provided with a partition 10 so as to divide the same into a foaming chamber 8 and a replenishing chamber 9, as best shown in FIG. 1. A foaming means 13 is provided in the foaming chamber 8 to which compressed air is supplied through an air pipe 12 from an air compressor 11. A replenishing means 7 for water is placed in the replenishing chamber 9. The compressed air jetted from the foaming means 13 in the aqueous surface active agent solution 5 generates minute foams 15. These minute foams 15 come to the surface of the aqueous surface active agent solution 5 while growing somewhat. In fact these foams are pushed by fresh foams 15 successively formed so that the mass of the grown foams 2 swell up on the surface of the aqueous surface active agent solution 5. The mass of the foams 2 grows up on all-over the surface up to the top of the foaming chamber 8 within a period of several seconds. The outer wall 6 is upwards extended into a vertically rounded top wall 16 which covers the top edge of the inner wall of the cavity 3 leaving the gap 4. The mass of the foams 2 with which the foaming chamber 8 is filled overflows the gap 4 into the cavity 3 and flows down along the entire inner surface of the inner wall thereof. The shape of the cavity 3 is approximately invertedly frustro-conical and the cavity 3 is provided with an outlet 17 at the bottom end thereof. The outlet 17 is connected with a foam-sealing tube 18 which is downwards inclined and extended into a tank 19. The foams 2 flow down in the cavity 3 towards the outlet 17 whence towards the tank 19 through the foam-sealing tube 18. The foams 2 flow as if a very viscous liquid so that the same stagnate and are accumulated in the thinner part of the serial passage of the cavity 3 and the foam-sealing tube 18, though the foams 2 flow down continuously. When the supply of the foam 2 from the gap 4 is interrupted, the foams 2 in the foam-sealing tube 18 remains as they are, while contracting along the contacting surface with atmosphere, for 12 to 36 hours. The foams 2 exhausted into the tank 19 disappear within a relatively short period by virtue of the substantially enlarged contacting surface with air and the continuous contact with the filth. In the cavity, the foams 2 get low as time elapses. However, the outlet 17 and the inner wall near the same are covered by the foams 2 for a substantially long period by virtue of reduction in the foam disappearing rate. Some quantity of the aqueous surface active agent solution 5 is carried by the foams 2 into the cavity 3, so that a film 26 of the aqueous surface active agent solution 5 remains on the inner surface of the inner wall of the cavity 3 as lubricant (FIG. 5).

When a mass 25 of excrement drops into the cavity 3, the upper surface of the mass of the foams 2 is partly broken and the mass 25 of excrement is admitted into the tank 19 through the outlet 17 and the foam-sealing tube 18 without being retained in the cavity 3 and the foam-sealing tube 18, by gravity and by virtue of the proper inclination and the lubricating action of the aqueous surface active agent solution film 26, so that the inner wall of the cavity 3 of the stool 1 is not contaminated. The tank 19 may be replaced by a domestic activated-sludge digestion tank, a municipal sewage pipe, or other storage means.

The mass of foams 2 once broken in the cavity 3 is restored by the surrounding foams and newly supplied foams. Although the foam-sealing tube 18 is not formed with a trap, the sealing action of the mass of foams 2 within the cavity 3 and the foam-sealing tube 18 constitutes a satisfactory barrier. The foams 2 are supplied into the cavity 3 before and after a use of the stool 1. In addition, it is preferred to provide a controller 20 for controlling the supply of foams 2 for a short period such as a minute at a predetermined interval so as not to be short of the foams 2 in the cavity 3, even if the stool 1 is not used for a long period. The controller 20 serves directly to manage operation of an air compressor 11 for generating the foams 2. In case of the general domestic installation, it is preferred to provide an automatic cyclic operation of the air compressor 11 for a period of one minute at intervals of one hour and a simple manual operation for operating before and after a use of the stool 1.

For a domestic use where the alternate current is available, it is preferred to use an electromagnetic diaphragm pump as the air compressor 11, which is simplified in construction, durable without troubles, and may be installed inexpensively. The statistic pressure of the air compressor 11 required is in the range of from 200 mm. to 500 mm. of the water column which is somewhat higher than the difference in height between the upper surface of the aqueous surface active agent solution 5 and the bottom of the foaming means 13 in the foaming chamber 8. The blast of the air compressor 11 is preferably as much as possible, so that the foams 2 are generated and the cavity 3 is filled therewith as soon as possible, ending in to consume less quantity of the aqueous surface active agent solution 5. Although the fresh foams 15 are generated in the foaming chamber 8 inside the stool 1 in this embodiment, it is also possible to generate the fresh foams 15 outside the stool 1. The quantity of the foams 2 supplied is approximately proportional to the blast of the air compressor 11 upon a certain condition. Excessively minute foams 2 are unsatisfactory but those admixed with larger sized foams are rather advantageous in view of the consumption of the aqueous surface active agent solution 5. For generating minute foams 2 it is preferred to form the foaming means 13 with a tube of a sintered alloy. The foams 2 serve as a lubricant by itself. By virtue of lightness the mass of foams is capable of deforming in accordance with any contour of the cavity 3 and flowing in any direction including upwards and through any clearances. It is also possible to use a circular pipe having several perforations in its wall instead of the inner peripheral gap 4, but the latter is more favourable. The inclination of the inner wall of the cavity 3 is more favourable when steeper, but in case of a smooth material, an inclination of about 20° is allowable. It is preferred to design the outlet 17 of the cavity 3 of about 100 mm. in diameter as in the general size for the water closet. It is preferred to design the foam-sealing tube 18 of about 75 mm. in diameter for keeping the mass of foams 2 even in an emergency. A certain length of the foam-sealing tube 18 is necessary, because it is possible to keep the seal by the foams 2 in the foam-sealing tube 18 for a matter of 24 hours after the foams 2 have disappeared near the outlet 17. If not an excessively thin tube is used for the foam-sealing tube 18, the mass of foams 2 never overflows the stool 1. However, it is preferred to adjust the controller 20 for operating for a matter of one minute for a cycle. A seat 27 is necessary, but regardless of the feature of this invention.

Figure 6:
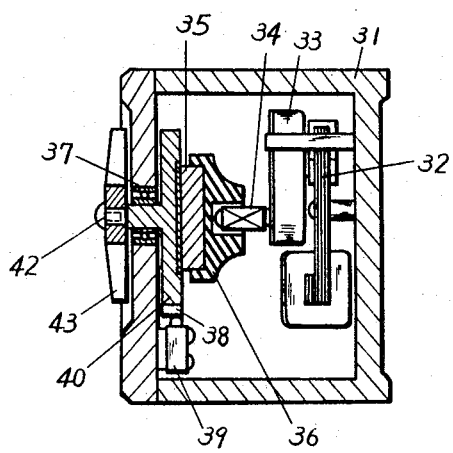
FIG. 6 is an enlarged vertically sectional side elevational view of the controller shown in FIGS. 1 and 2.

The controller 20 comprises a housing 31 in which a timing electric motor 32 is provided as shown in FIG. 6.

Figure 8:
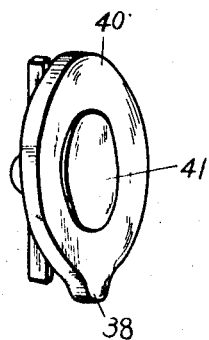
FIG. 8 is a further enlarged perspective view of the disc cam provided inside the controller shown in FIG. 6.
Figure 7:
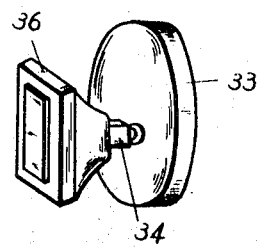
FIG. 7 is a further enlarged perspective view of the holder provided inside the controller shown in FIG. 6.
Figure 9:
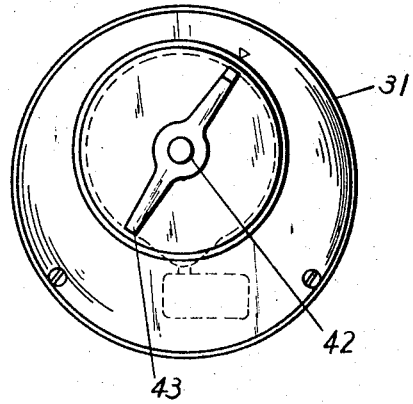
FIG. 9 is a further enlarged front elevational view of the knob provided on the controller shown in FIG. 6.
Figure 10:
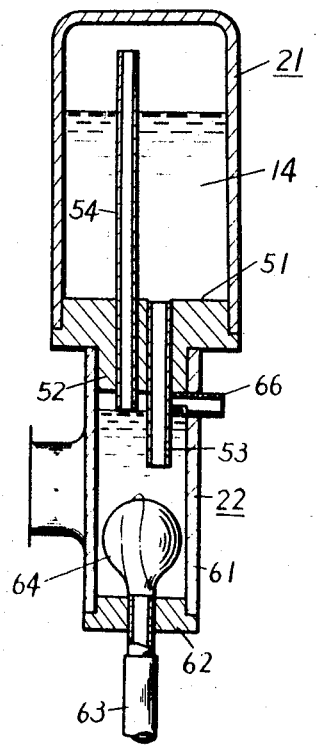
FIG. 10 is an enlarged vertically sectional elevational view of the concentration maintaining means combined with the reservoir shown in FIG. 1.

An output shaft 34 is arranged longitudinally within the housing 31 and adapted to be driven by the motor 32 intermediate a reduction gear 33. A holder 36 made of a synthetic rubber or the like is mounted on the output shaft 34 at the rear side thereof and a magnet 35 is fixedly inlaid in the front side of the holder 36 as shown in FIG. 7. A disc cam 40 is arranged just behind the front wall of the housing 31 and provided with an iron plate 41 fixed on the rear surface of the disc cam 40 as shown in FIG. 8, and in the close proximity of the magnet 35. A frontward protrusion 42 of the disc cam 40 is formed coaxially with the output shaft 34, by means of which the disc cam 40 is journalled rotatably by a bearing 37 secured to the front wall of the housing 31. The disc cam 40 is formed with a radial protrusion 38 which is adapted to be brought into contact with a microswitch 39 so as to make the latter. The microswitch 39 may be thus made automatically by the disc cam 40 driven by the motor 32 intermediate the magnetic action of the magnet 35 acting on the iron plate 41. A knob 43 is fixedly mounted on the extremity of the frontward protrusion 42 of the disc cam 40 on the front surface of the front wall of the housing 31 as shown in FIG. 6. By this arrangement it is also possible to turn the disc cam 40 manually so as to make the microswitch 39 regardless of the operation of the motor 32.

Since the aqueous surface active agent solution 5 comprises a major part (99% to 99.9%) of water, the quantity of the concentrated surface active agent solution 14 to be replenished for keeping the concentration of the solution 5 against the production of the foam 2 is very small. A means for replenishing the concentrated surface active agent is illustrated in FIGS. 1, 2, 10 and 11, which comprises a reservoir 21 for the concentrated surface active agent solution 14 and a concentration maintaining means 22.

The reservoir 21 is made of a synthetic resin and provided with a removable stopper 51 which is adapted to be engaged with the mouth of the reservoir 21 in a liquidtight manner. The stopper 51 has a central outward protrusion 52 through which two pipes are extended: One is an outlet pipe 53 extending outward to an extent just from the inner surface of the stopper 51. The other is a vent pipe 54 extending from the outer surface of the stopper 51 to the proximity of the bottom of the reservoir 21.

Figure 11:
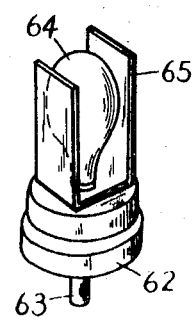
FIG. 11 is an enlarged perspective view of the bulb shown in FIG. 10.

The concentration maintaining means 22 comprises a cylinder 61, of which the top opening is adapted to receive airtightly the outward protrusion 52 of the stopper 51 of the reservoir 21 when the latter is inverted and set upside down in the top opening of the cylinder 61. The cylinder 61 is provided with a bottom stopper 62 and closed liquidtightly thereby. A pipe 63 is extended through the bottom stopper 62. An inflatable and contractible elastic bulb 64, for example of rubber, is arranged inside the cylinder 61 and connected with the inner end of the pipe 63 and the other end of the pipe 63 is connected with a branch of the air pipe 12 so that the elastic bulb 64 may be inflated by compressed air supplied by the air compressor 11. The inflation of the bulb 64 may be limited to an optional extent by means of a pair of limiting plates 65 arranged in the opposed close proximity of the elastic bulb 64 as shown in FIG. 11.

There is an overflow pipe 66 in and through the side wall of the cylinder 61. It is necessary that the end of the vent pipe 54 is extended inside the cylinder 61 to a level where the overflow pipe 66 is arranged, when the reservoir 21 is inverted and set upside down in the top opening of the cylinder 61. Of course, at the same time the outlet pipe 53 is extended beyond the level.

Now the reservoir 21 and the cylinder 61 are filled with the concentrated surface active agent solution 14. When the elastic bulb 64 is inflated by compressed air, the concentrated surface active agent 14 contained in the cylinder 61 of the concentration maintaining means 22 is overflown through the overflow pipe 66 into the replenishing chamber 9 of the stool 1. When the elastic bulb 64 is contracted due to shortage of pressure applied from the air compressor 11, the level of the upper surface of the concentrated surface active agent solution 14 contained in the cylinder 61 is lowered so that the end of the vent pipe 54 is disengaged from the upper surface of the solution 14 and exposed to the atmosphere. Thus the concentrated surface active agent solution 14 contained in the reservoir 21 is supplied into the cylinder 61 through the outlet pipe 53 by gravity and air is introduced into the reservoir 21. Of course, when the level of the upper surface of the solution 14 is restored in the cylinder 61, no more solution 14 is overflown through the overflow pipe 66 and at the same time the end of the vent pipe 54 is checked so that the supply of the solution 14 from the reservoir 21 to the cylinder 61 is interrupted.

Figure 12:
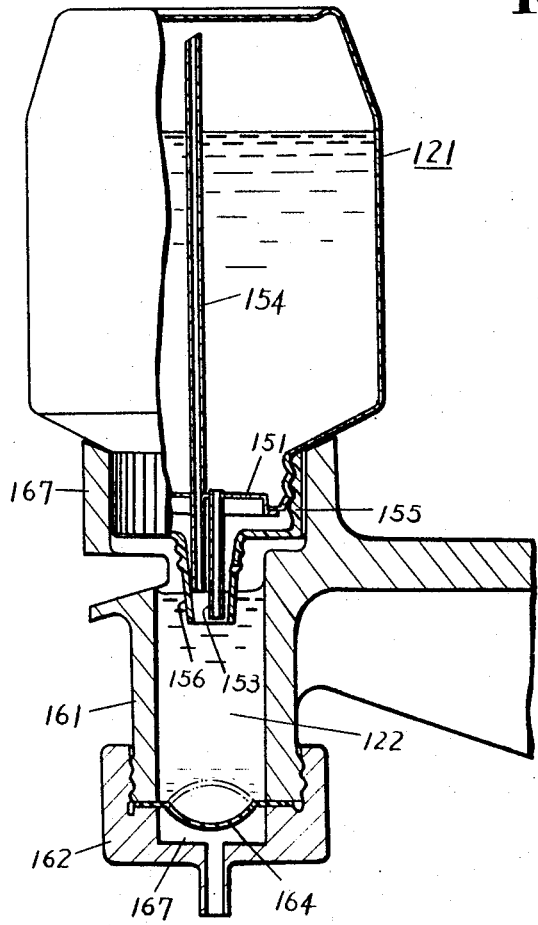
FIG. 12 is an enlarged partly vertically sectional elevational view of a modification of the concentration maintaining means combined with a modified reservoir.
Figure 13:
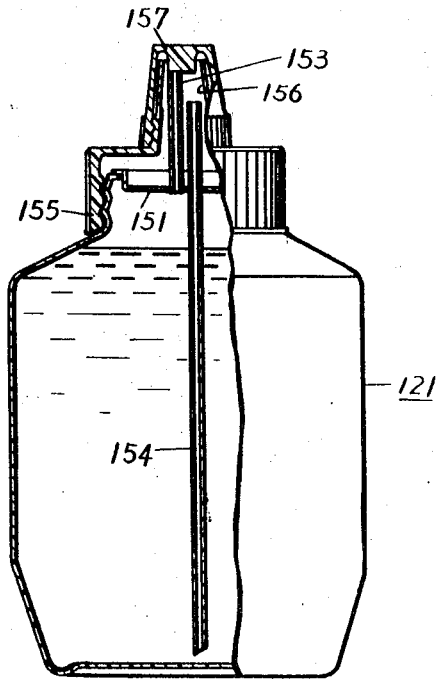
FIG. 13 is a partly removed view of the modified reservoir in the portable position.

Referring more particularly to FIGS. 12 and 13, a modification of the reservoir 121 to be combined with a modified concentration maintaining means 122 will be described. The modified reservoir 121 is adapted to be portable and provided with a screwed mouth. A neck member 155 is adapted to be screwed on the screwed mouth of the reservoir 121 and formed with a knurled outer wall for facilitating the screwing operation for opening and closing the mouth of the reservoir 121. An inside lid 151 is set on an inner flange of the mouth formed on the top thereof. A ring gasket is inserted between the neck member 155 and the inside lid 151 so as to screw up the neck member 155 on the screwed mouth in an airtight manner. The neck member 155 is formed with a central protruded opening 156 having a screwed outer wall, on which a cap 157 is adapted to be screwed so as to seal the central protruded opening 156. The cap 157 is provided with a knurled outer wall for facilitating to screw it, as shown in FIG. 13. An outlet pipe 153 and a vent pipe 154 are fixed to and through the inside lid 151. The outlet pipe 153 is extended from the inside of the inside lid 151 to the just inside of the cap 157 and the vent pipe 154 is extended from the proximity of the bottom of the reservoir 121 to the proximity of the top of the central protruded opening 156.

For charging the reservoir 121 with the concentrated surface active agent solution, the neck member 155 is unscrewed from the mouth of the reservoir 121 together with the cap 157 and the inside lid 151 is removed so as to expose the mouth for the charging operation. The charged reservoir 121 is sealed with the inside lid 151, the neck member 155 and the cap 157 in the airtight manner as described above. It is to be seen that the charged reservoir 121 sealed as above is facilitated to be transferred.

When the cap 157 is removed and the charged reservoir 121 is inverted and set upside down in an expanded top opening 167 of a cylinder 161 of the concentration maintaining means 122, as shown in FIG. 12, the neck member 155 is adapted to be engaged with the expanded top opening 167. In this embodiment, a diaphragm 164 is substituted for the elastic bulb 64 in the preceding embodiment. The bottom end of the cylinder 161 is formed with an external screw thread on which an internal screw thread of a bottom stopper 162 is engaged. A space 167 is provided inside the bottom stopper 162 between which and the inside space of the cylinder 161 are arranged the diaphragm 164 secured in place by being clamped between the end of the cylinder 161 and a shoulder of the bottom stopper 162. The diaphragm 164 is formed with an inflated central part which is inflatable to either side quick on the trigger manner in response to the pressure applied.

The capacity of the reservoir 21 or 121 may be in the range of 500 to 1,000 cc. which is large enough for consumption for a period of several months in case the concentration of the concentrated surface active agent solution 14 is a matter of 50 percent. One operation of the unit requires about 100 cc. of from 0.1 to 1.0 percent aqueous surface active agent solution 5 for producing foam. Therefore, when the concentrated surface active agent solution 14 is 50 percent in concentration, it is necessary to replenish about 0.2 to 2 cc. of the concentrated solution 14. It is somewhat difficult to charge such an extremely small quantity of the concentrated solution 14 into the replenishing chamber 9 automatically. By virtue of the concentration maintaining means 22 or 122, it is possible to charge the concentrated solution 14 into the replenishing chamber 9 at will.

Figure 14:
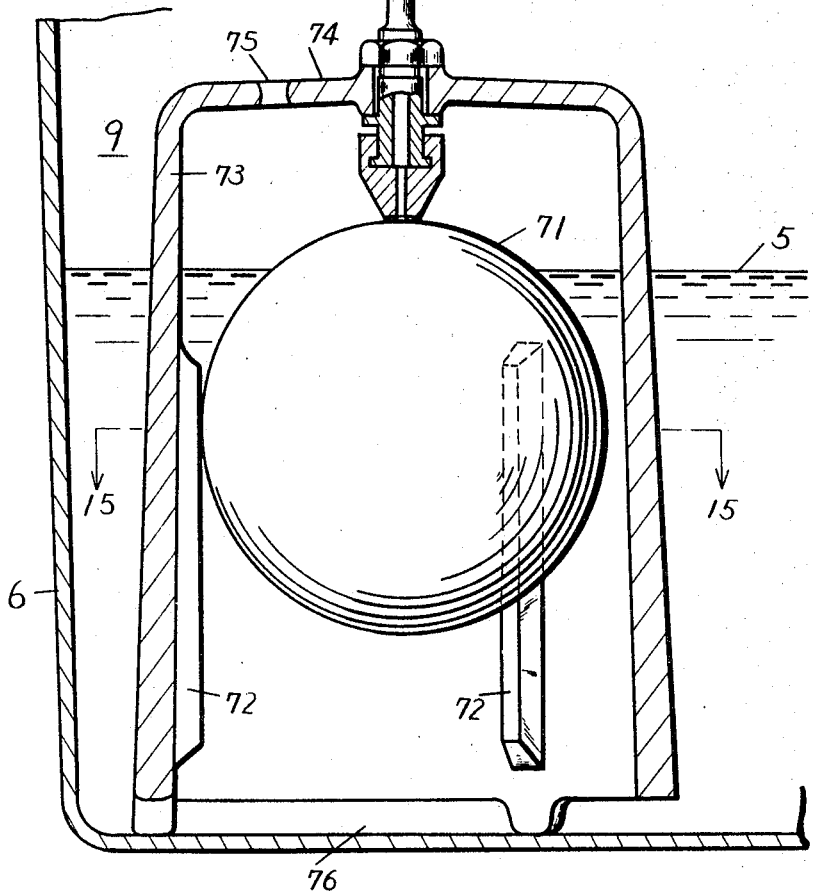
FIG. 14 is an enlarged vertically sectional elevational view of the replenishing means shown in FIG. 1.
Figure 15:
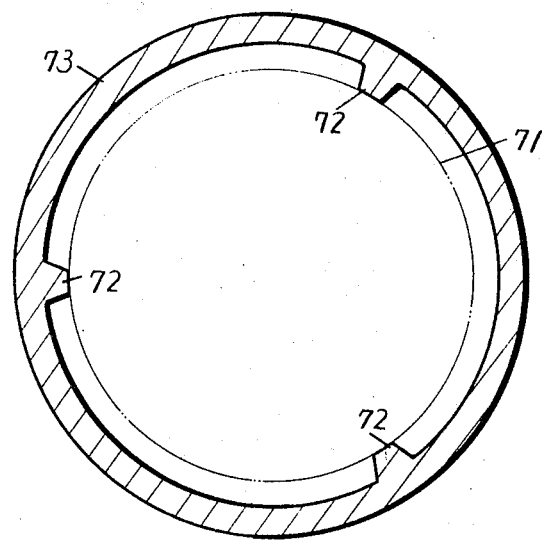
FIG. 15 is a cross-sectional view thereof taken along line 15—15 in FIG. 14.

Referring now particularly to FIGS. 14 and 15, there is a floating ball 71 in the replenishing chamber 9. The floating ball 71 is adapted to be engaged with an end of a watering pipe 24 during the level of the aqueous surface active agent solution 5 is high enough, on which the floating ball 71 is floated. When the level is lowered, the floating ball 71 is also lowered being guided by three guides 72 so that the end of the watering pipe 24 is released for watering until the floating ball 71 is elevated enough again. It is sufficient to provide an extremely thin pipe for the watering pipe 24. In case of the embodiment shown in the drawings, there is provided a cylindrical casing 73 in which the floating ball 71 is arranged and the three guides 72 are integrated with the cylinder 73. The watering pipe 24 is extended through a top wall 74 of the cylinder 73. Numeral 75 denotes a vent hole and numeral 76 denotes a passage for the aqueous surface active agent solution 5. In case where a high water pressure is provided or the watering pipe 24 is directly connected with a public utility service, it is preferred to use a well known ball cock means, because it is a simple and inexpensive mechanism.

It is to be noticed that, although the surface active agent solution replenishing means and the water replenishing means have been illustrated and described as being integrated with the stool 1, it is also possible to separate them from the stool 1 with an appropriate connecting means therewith for facilitating any repair and replacement of parts without contaminating hands.

Although the construction and action of the defecating system in accordance with this invention have been illustrated and described for defecating feces, urine may be more easily defecated. The urine flows down through the mass of foams 2 in the cavity 3 and the foam-sealing tube 19 to the tank 19, without substantially breaking the mass of foams 2. A waste toilet paper is wetted so as to be made heavier with moisture and, when a part of the foams 2 disappears, the volume of the waste paper is reduced gradually. Thus the waste paper is displaced towards the tank 19 within a period which is somewhat longer than the period for displacing the feces. An excessive volume of waste paper requires a longer time for displacing it than the above case, but anyhow displacement of such waste paper into the tank 19 is a question of time.

Some experimental results will now be described. The inclination of the inner wall of the cavity 3 of the stool 1 was at least 40° which may be selected at will. The inclination of the foam-sealing tube 18 was at least 25°, which is preferred in view of the consumption of the aqueous surface active agent solution 5. The foam-sealing tube 18 was 75 mm. in diameter. The stool 1 and the foam-sealing tube 18 were made of a reinforced plastics in view of requirements in strength, construction, and corrosion resistance. As the surface active agent, an anionic one having the following components was used:

| | Percent |
|---|---|
| Sodium dodecyl benzene sulfonate | 30 |
| Phosphate | 30 |
| Glauber's salt ($Na_2SO_4$) | 20 |
| Sodium carbonate | 5 |
| Sodium carboxymethyl cellulose | 1 |
| Others including sodium borate | 14 |

1 g. of the above surface active agent was dissolved in 1000 cc. of water to provide the aqueous surface active agent solution. About 10 liters per minute of air were admitted into the foaming means 13 of a sintered metal under a static pressure of 500 mm. of water column. At first the foaming operation was continued for about 8 seconds. In the second foaming operation, the foams 2 were supplied into the cavity 3 through the gap 4 and, after further operation of about 5 seconds, the foam-sealing tube 18 is filled with the mass of foams 2 up to the outlet 17 of the cavity 3. The period of supplying foams 2 into the cavity 3 through the gap 4 was 1.5 to 2 seconds on an average, exclusive of the first operation.

Then the system was used for the actual excretion. The feces 25 were promptly exhausted into the tank 19. The mass of foams 2 once broken was restored immediately by fresh foams so that the toilet was deodorized completely. About 50 cc. of the aqueous surface active agent solution 5 were consumed by operating the air compressor 11 for one minute. After 12 hours of interruption, the top of the mass of foams 2 was positioned about 10 cm. below from the outlet 17 in the foam-sealing tube 18. No contamination on the inner wall of the cavity 3 of the stool 1 based on the excrement was observed. It is preferred from the sanitary point of view for those who sit on the stool 1 for a substantially long period that the controller 20 is actuated before and after the excretion so as to foam for one minute, respectively. By this manner about 100 cc. of water is consumed for the above two operations, which is to be considered a minute quantity comparing with 15 liters or about 150 times of the 100 cc. required by a unit of the water closet. Even when the air compressor 11 was operated only just before the excretion, it was sufficiently possible to keep the stool 1 in the clean state. In this case, the consumption of water is only such an extremely minute quantity as one three-hundredth for the water closet. There is never splash of the contaminated water in the cavity 3 of the stool 1 in accordance with this invention. The foams 2 in the cavity 3 may be illuminated optically beautifully by the lighting arrangement in the toilet so that the toilet becomes mentally sanitary.

While particular embodiments of the invention have been illustrated and described, modifications thereof will readily occur to those skilled in the art. It should be understood therefore that the invention is not limited to the particular methods, arrangements, and structures disclosed but that the appended claims are intended to cover all modifications which do not depart from the true spirit and scope of the invention.

What is claimed as new and desired to be secured by Letters Patent of the United States is:

1. A toilet unit for processing body wastes comprising a stool member having a substantially funnel configuration and forming a cavity therein,
   and including a storage area being divided into a foaming chamber and a replenishing chamber, and adapted to contain a foamable liquid,
   said foaming chamber being provided with a foaming means adapted to convert said foamable liquid into said foam,
   said replenishing chamber being provided with a maintaining means which is adapted to maintain said foamable liquid in a constant condition with respect to the concentration and quantity thereof, and
   said cavity being supplied with said foam from said foaming chamber across the top of a wall of said cavity, whereby said wall is lubricated, and to receive, hide and seal body wastes inside said foam when placed in said cavity, and
   a foam-sealing tube connected with said outlet of said cavity so as to transfer body body wastes together with said foam by the gravity action.

2. A toilet unit as claimed in claim 1, including a storage area,
   being divided into a foaming chamber and a replenishing chamber, and adapted to contain the aqueous surface active agent solution, said foaming chamber being provided with a foaming means adapted to produce foam from said aqueous surface active agent solution by bubbling compressed air supplied from an air compressing means, said replenishing chamber being provided with a concentration maintaining means adapted to supply concentrated solution of said surface active agent and water individually and automatically when said aqueous surface active agent solution contained in said foaming chamber is consumed so as to maintain said aqueous surface active agent solution in a constant condition with respect to the concentration and quantity thereof, and said cavity being supplied with said foam from said foaming chamber across the top of a wall of said cavity, whereby said wall is lubricated, and to receive, hide, and seal said body wastes inside said foam when placed in said cavity, and a foam-sealing tube connected with said outlet of said cavity so as to transfer said body wastes together with said foam by the gravity action.

3. A stool for use in said toilet unit as claimed in claim 1, comprising an outer wall and an inner wall, said inner wall defining the cavity, and a storage area being defined between said outer and inner walls, said outer wall having an inward turned top end which covers the top edge of said inner wall putting a space therebetween so as to form a gap for passing said foam from said storage area to said cavity.

4. A concentration maintaining means in combination with a reservoir, for use in said toilet unit as claimed in claim 1, comprising a vessel having an overflow pipe and adapted to be filled with the concentrated surface active agent solution up to the level of said overflow pipe, an elastic diaphragm bordering said concentrated surface active agent solution from a space containing air in said vessel, said space being communicated with a pipe connecting said air compressing means with said foaming means so as to overflow said concentrated surface active agent solution through said overflow pipe in response to the operation of said foaming means, and said reservoir being set on said vessel and provided with an outlet pipe and vent pipe, said vent pipe being extended down to said level so as to admit air into a confined space above said concentrated surface active agent solution contained inside said reservoir only when said level is lowered, said outlet pipe being adapted to supply said concentrated surface active agent solution into said vessel only when said confined space is replenished with air through said vent pipe, and said reservoir being adapted to be removed from said vessel and inverted for being handled as an independent reservoir.

5. A water replenishing means for use in said toilet unit as claimed in claim 1, comprising a watering pipe adapted to supply water into a replenishing chamber, and a floating ball adapted to check said water at the end of said watering pipe when said floating ball is elevated to a level and released said end for watering when said floating ball is lowered with said level, while being floated on said aqueous surface active agent solution.

6. A portable reservoir means for containing said concentrated surface active agent solution and replenishing a concentration maintaining means with it, for use in said toilet unit as claimed in claim 1, comprising a reservoir provided with a mouth for charging the reservoir with said concentrated surface active agent solution, a neck member adapted to be engaged with said mouth in an airtight manner and removable therefrom and having a central protruded opening, a cap adapted to be engaged with said central protruded opening and removable therefrom, and an inside lid adapted to be set between said mouth and said neck member and provided with an outlet pipe and a vent pipe, said central protruded opening being adapted to be engaged also with an expanded top opening of a cylinder of said concentration maintaining means when said cap is removed and said reservoir is inverted and set on said expanded top opening together with said neck member engaged with said reservoir, and said cylinder being allowed to be replenished through said outlet pipe with said concentrated surface active agent solution contained in said reservoir while the same is charged with air through said vent pipe when the top end of said vent pipe of said inverted reservoir is separated from the concentrated surface active agent solution contained in said cylinder.

References Cited
UNITED STATES PATENTS

| | | | |
|---|---|---|---|
| 3,383,710 | 5/1968 | Sumner | 4—1 |
| 1,348,828 | 8/1920 | Fessenden | 181—33.02X |

LAVERNE D. GEIGER, Primary Examiner

R. J. SHER, Assistant Examiner